Feb. 5, 1963 A. J. PIEL 3,076,510
AIR PROPELLED ELECTRICITY GENERATOR FOR MOVING VEHICLES
Filed July 13, 1959 2 Sheets-Sheet 1

Witness
Edward P. Seeley

Inventor
Alfred J. Piel
by M. Talbert Dick
Attorney

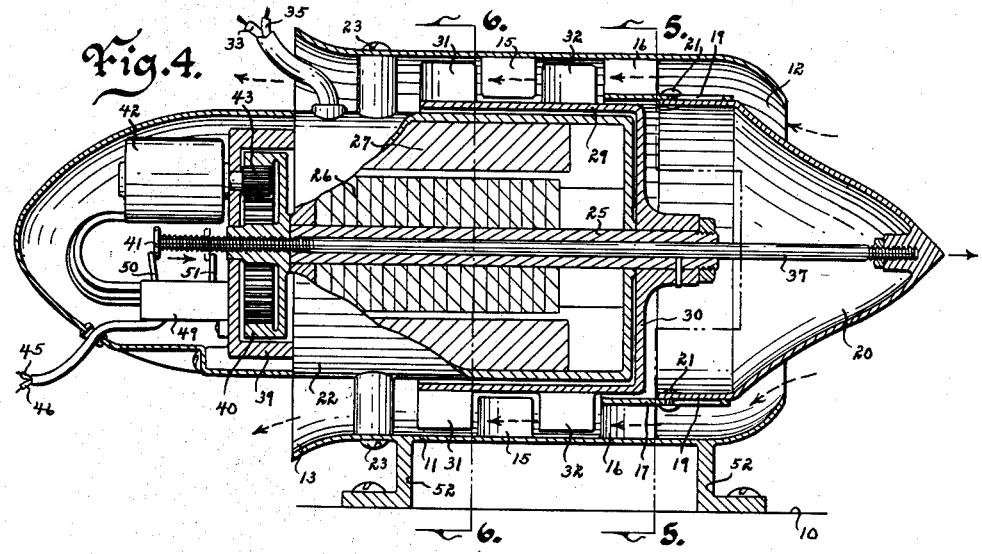

United States Patent Office 3,076,510
Patented Feb. 5, 1963

3,076,510
AIR PROPELLED ELECTRICITY GENERATOR
FOR MOVING VEHICLES
Alfred J. Piel, Hubbard, Iowa
Filed July 13, 1959, Ser. No. 826,639
8 Claims. (Cl. 170—40)

This invention relates to electricity generators and more particularly to a generator that is actuated by movement through the atmosphere.

Most moving vehicles, such as airplanes, trucks, automobiles, trains and like, require electricity for accomplishing various tasks during the movement of the vehicle. Most such vehicles have a generator operatively connected to the prime mover of the vehicle which produces electricity and stores it in a battery. This operation is a substantial drain on the power of the prime mover and in the case of airplanes, if there be an engine failure, the airplane might well be without electrical power for the operation of instruments, controls, lighting, and like.

Therefore, one of the principal objects of my invention is to provide a generator that may be secured to a moving vehicle, and its passing through the atmosphere or like medium will cause its movable parts to rotate and produce an electrical current.

A further object of this invention is to provide a wind driven electricity generator that may be easily and quickly placed into functioning operation, or as easily rendered non-operative.

A still further object of this invention is to provide an air driven generator that is of light weight.

A still further object of my invention is to provide a generator that is easily secured to a vehicle.

A still further object of my invention is to provide a wind driven generator for moving vehicles that produces a minimum drag.

Still further objects of this invention are to provide a wind driven electrical generator for moving vehicles that is economical in manufacture, durable in use, and refined in appearance.

These and other objects will be apparent to those skilled in the art.

Figure 1:
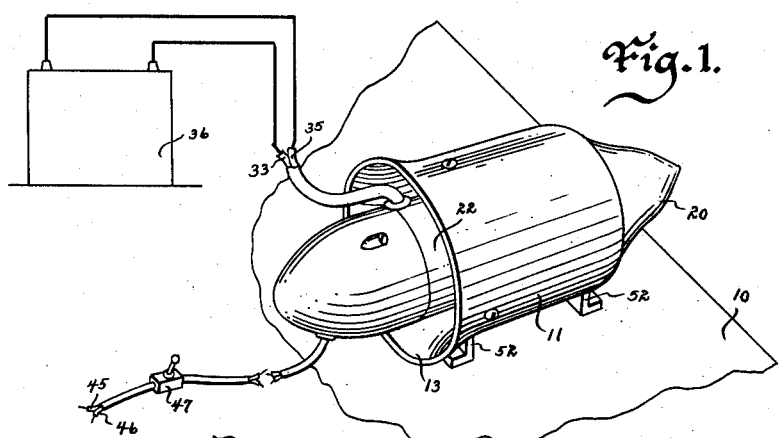
Figure 2:
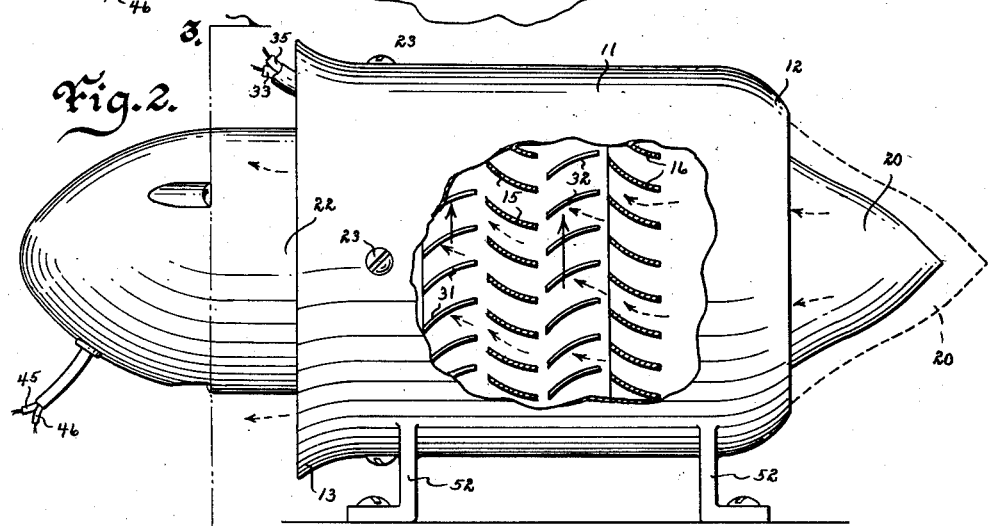
Figure 3:
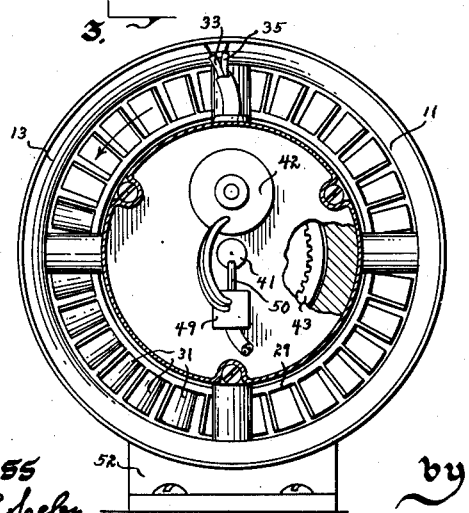

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my generator mounted and ready for use,

FIG. 2 is an enlarged side view of my electricity generator with a section cut away to more fully illustrate its construction, FIG. 3 is an enlarged cross sectional view of the generator taken on line 3—3 of FIG. 2, FIG. 4 is an enlarged longitudinal sectional view of the device, FIG. 5 is an enlarged cross sectional view of the generator taken on line 5—5 of FIG. 4, and FIG. 6 is a cross sectional view of the generator taken on line 6—6 of FIG. 4.

In many instances my generator will be used only as an auxiliary generator, during emergencies, or as an additional electricity generator for a vehicle having a standard motor driven generator. In other cases, my generator may be the sole electricity producing device of the moving vehicle. My generator may be mounted on the vehicle in any suitable manner provided its forward end is exposed to the air or like flow past the vehicle. In this connection it may be mounted in and protrude from the leading edge of the wing of an airplane, or it may be mounted to protrude from the nose of the vehicle.

As herebefore indicated, any flowable medium will actuate my generator and it is therefore adapted for even underwater craft, and wherein the water would act as the flowable medium for turning the movable parts of the generator.

The numeral 10 designates a portion of a vehicle. The numeral 11 designates the cylindrical housing of my generator open at both ends. The forward end of this housing is curved inwardly at 12 and is adapted to head into the medium through which the vehicle is traveling. The rear end portion of the housing 11 is flared outwardly at 13 as shown in FIG. 4. Inside the housing 11 are two spaced apart rows of vanes 15 and 16. These vanes are positioned at an angle to the longitudinal axis of the housing 11 as shown in FIG. 5. The numeral 17 designates a drum cylinder secured to the outer ends of the vanes that make up the row of vanes 16, as shown in FIG. 4. This cylindrical drum 17 extends forwardly toward the forward open end of the housing 11 and has a plurality of slots 19, extending longitudinally of the housing 11. Inasmuch as the cylindrical drum 17 is secured to the inner edges of the vanes 16, it has a diameter substantially less than that of the diameter of the central portion of the housing 11. The numeral 20 designates a nose cone having its tapered end extending through the forward end of the housing 11 and its rear end slidable within the cylindrical drum 17. The numeral 21 designates headed rivets extending through the rear end portion of the nose cone and through the slots 19. The rear end portion of the nose cone is of a diameter greater than that of the diameter of the open end of the housing 11. By this construction, when the nose cone 20 is moved forwardly relative to the housing 11, it will close the open end of the housing 11, and when the nose cone is slid rearwardly, its tapered end will move away from the restricted forward end of the housing 11 to provide an air entrance between the inside of the housing 11 and the nose cone.

The numeral 22 designates the generator closed housing extending into the rear end area of the outer housing 11 and rigidly supported therein by any suitable means such as the cap screws 23. The diameter of the housing 22 is substantially less than that of the diameter of the outer housing 11 and, to reduce wind drag, its rear end portion is bullet-shaped as shown in FIG. 1. The numeral 25 designates the generator shaft rotatably mounted in the housing 22 and extending through the forward end of the housing 22. The numeral 26 designates the rotatable armature coils secured around the rotatable shaft 25 and inside the housing 22. The numeral 27 designates the fixed field coils secured to the inner side of the housing 22 and embracing the coils 26 as shown in FIG. 4. The numeral 29 designates a cylinder rotatably embracing the forward end portion of the cylindrical housing 22. The numeral 30 designates a spanner on the forward end of the cylinder 29 and rigidly connected to the forward end of the shaft 25. Outwardly extending from the cylinder 29 are two rows of vanes 31 and 32. These fin vanes extend at an angle to the longitudinal axis of the housing 11 but at an angle opposed to that of the angle of the fixed fin vanes 15 and 16, as shown in FIG. 5 and FIG. 6. The row of vanes 32 is spaced between the fixed vanes 15 and 16 and the row of vanes 31 is at the rear of the row of vanes 15. By this construction, when air is passed through the housing 11, it will act on the row of vanes 31 and 32, and thereby rotate the cylinder 29. By the cylinder 29 being so rotated, the core of the generator, armature coils 26, of the generator will be rotated and electricity will be generated in the well known manner. The two lead wires extending from the generator have been designated by the numerals 33 and 35. These electric lead lines may extend to point of use or they may be connected to a storage battery 36, as shown in FIG. 1. The numeral 37 designates a shaft rotatably extending through the shaft 25 and having its forward end secured to the inside of the outer end of the nose cone 20. The numeral 39 designates a gear housing operatively secured to the inside rear of the housing 22. Inside this gear housing and threaded onto the rear end portion of the shaft 37 is an internal toothed gear wheel 40. The shaft 37 extends to the rear of the gear housing 39 and has a switch stop head 41 on its rear end. The numeral 42 designates a small electric motor mounted in the rear end of the housing 22 and having a pinion gear 43 in mesh with the internal gear wheel 40. The numerals 45 and 46 designate two electric lead lines extending from and to the electric motor 42 and adapted to be in communication with a source of electrical supply, such as a small auxiliary battery (not shown). The numeral 47 designates a two-way hand switch imposed in the electric lead lines 45 and 46, inasmuch as it is necessary for the electric motor 42 to be reversible. Thus, by moving the switch 47 in one direction, the motor 42 will rotate in one direction and when the switch is moved to the opposite direction, the motor will rotate in the opposite direction. When the switch is in neutral, the electric motor will be disconnected from its source of electricity. By this arrangement of parts, when the switch 47 is placed in one position, the small electric motor 42 will rotate the gear wheel 40 in one direction and inasmuch as it is threaded onto the shaft 37, the shaft 37 will move forwardly, thereby carrying the nose cone forward and closing the forward open end of the cylinder 11. If the switch 47 is placed in the opposite position, the motor 42 will rotate the gear wheel 40 in the opposite direction and this will move the shaft 37 to the rear, carrying with it the nose cone and thereby opening the forward end of the housing 11. With the forward end of the housing 11 open and with the vehicle traveling through the atmosphere or like, the air will pass through the housing 11 rotating the cylinder 29 as hereinbefore described. When it is desired to prevent my generator from functioning, it is merely necessary to cause the gear wheel 40 to rotate in a direction to move the nose cone forwardly and close the forward end of the housing 11. With no air passing through the cylinder housing 11, the fin blades of the rows of vanes 31 and 32 will remain stationary. When it is again desirable to place the generator in operation on the moving vehicle, the switch 47 is manually actuated to move the nose cone to the rear. Also, within the lead wires 45 and 46, I impose an ordinary safety switch 49 having the usual two movable switch lugs 51 and 50 as shown in FIG. 4. These two switch lugs 50 and 51 extend at each side of the stop head 41 of the shaft 37. Therefore, in placing my device into and out of operation, it is merely necessary to hold the lever of the switch 47 in the desired position until the current is automatically shut off by the safety switch 49. In the drawings I show brackets 52 on the housing 11 for securing the device to the vehicle 10.

Some changes may be made in the construction and arrangement of my air propelled electricity generator for moving vehicles without departing from the real spirit and purpose of my invention, and it is my intention to cover by my claims, any modified forms of structure or use of mechanical equivalents which may be reasonably included within their scope.

I claim:

1. In an air driven motor means, comprising, in combination, a cylindrical housing having an open forward end and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, and a nose cone concentrically disposed on the forward end of said second shaft and located within said cylindrical housing in such a manner that the apex and a portion of the body of said nose cone extends forwardly through said forward end of said cylindrical housing.

2. In an air driven motor means, comprising, in combination, a cylindrical housing having an open forward end and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, and a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades.

3. In an air driven motor means, comprising, in combination, a cylindrical housing having an open forward end and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades, and means for adjustably positioning said second shaft in relation to its longitudinal movement through said first shaft thereby providing said nose cone with a capability of being longitudinally adjustable in relation to said cylindrical housing.

4. In an air driven motor means, comprising, in combination, a cylindrical housing having an open forward end and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, and a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades;

said cylindrical housing having its forward end portion curved inwardly so as to provide a forward opening of a diameter less than that of the diameter of the rearwardly extending base portion of said nose cone.

5. In an air driven motor means, comprising, in combination, a cylindrical housing having an open forward end and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, and a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades;

said rear end portion of said cylindrical housing being outwardly and rearwardly flared.

6. In an air driven motor means, comprising, in combination, a cylindrical housing having an open forward end and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades; and stationary fins disposed on the inner surface of said cylindrical housing and extending radially inwardly therefrom.

7. In an air driven motor means, comprising, in combination, a cylindrical housing having an open forward and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades; and stationary fins disposed on the inner surface of said cylindrical housing and extending radially inwardly therefrom;

said fan blades on said cylinder and said inwardly extending fins on said cylindrical housing being respectively arranged in alternate circular paths extending transversely of the longitudinal axis of said cylindrical housing.

8. In an air driven motor means, comprising, in combination, a cylindrical housing having an open forward and an open rear end, a rotatable shaft concentrically longitudinally disposed in said housing, a cylinder inside said housing and concentrically longitudinally secured to said shaft, radially extending fan blades disposed on said last mentioned cylinder and inside said cylindrical housing, a second shaft concentrically longitudinally extending through said first shaft and adapted to be rotatably disposed therein and to be longitudinally slidably movable therethrough, said second shaft being of sufficient length to extend beyond the front and rear ends of said first shaft, a nose cone concentrically disposed on the forward end of said second shaft and located within said cylindrical housing in such a manner that the apex and a portion of the body of said nose cone extends forwardly through said forward end of said cylindrical housing;

said nose cone being suitably adapted to direct air through said housing and past said fan blades; and stationary fins disposed on the inner surface of said cylindrical housing and extending radially inwardly therefrom;

said fan blades on said cylinder and said inwardly extending fins on said cylindrical housing being respectively arranged in alternate circular paths extending transversely of the longitudinal axis of said cylindrical housing;

said inwardly extending fins on said cylindrical housing being arranged at such an angle of incidence in relation to the longitudinal axis of said cylindrical housing that the fluent material flowing past said fins is deflected at a substantially direct angle of incidence onto the angle of incidence of said fan blades.

References Cited in the file of this patent

UNITED STATES PATENTS

| | | | |
|---|---|---|---|
| 15,714 | Whitman | Sept. 9, | 1856 |
| 147,282 | Pratt | Feb. 10, | 1874 |
| 555,806 | Dolsen | Mar. 3, | 1896 |
| 984,599 | Pichault | Feb. 21, | 1911 |
| 1,362,753 | Sperry | Dec. 21, | 1920 |
| 2,254,892 | Grundhalt | Sept. 2, | 1941 |
| 2,329,606 | Goodman | Sept. 14, | 1943 |
| 2,706,255 | Breaux et al. | Apr. 12, | 1955 |
| 2,743,375 | Parker | Apr. 24, | 1956 |
| 2,939,017 | Teague et al. | May 31, | 1960 |
| 2,941,613 | Di Perna | June 21, | 1960 |
| 2,949,540 | Clayton | Aug. 16, | 1960 |

FOREIGN PATENTS

| | | | |
|---|---|---|---|
| 1,007,883 | France | Feb. 13, | 1952 |

OTHER REFERENCES

Ser. No. 326,141, Ramshorn (A.P.C.), published May 11, 1943.